United States Patent
Niroumand et al.

(10) Patent No.: US 12,352,004 B2
(45) Date of Patent: Jul. 8, 2025

(54) EARTH ANCHORS AND METHOD OF PRODUCTION THEREOF

(71) Applicants: Hamed Niroumand, Tehran (IR); Lech Bałachowski, Gdansk (PL)

(72) Inventors: Hamed Niroumand, Tehran (IR); Lech Bałachowski, Gdansk (PL)

( * ) Notice: Subject to any disclaimer, the term of this patent is extended or adjusted under 35 U.S.C. 154(b) by 250 days.

(21) Appl. No.: 18/138,091

(22) Filed: Apr. 23, 2023

(65) Prior Publication Data

US 2024/0352700 A1    Oct. 24, 2024

(51) Int. Cl.
| | |
|---|---|
| *E02D 5/80* | (2006.01) |
| *B33Y 10/00* | (2015.01) |
| *B33Y 70/00* | (2020.01) |
| *B33Y 80/00* | (2015.01) |

(52) U.S. Cl.
CPC ............. *E02D 5/801* (2013.01); *B33Y 10/00* (2014.12); *B33Y 70/00* (2014.12); *B33Y 80/00* (2014.12); *E02D 2300/0006* (2013.01)

(58) Field of Classification Search
CPC ... E02D 5/80; E02D 5/801; E02D 2300/0006; E02D 2300/0007; B33Y 10/00; B33Y 70/00; B33Y 80/00
See application file for complete search history.

(56) References Cited

U.S. PATENT DOCUMENTS

| | | | |
|---|---|---|---|
| 3,282,002 A | 11/1966 | Jefferson et al. | |
| 4,251,963 A * | 2/1981 | Patterson | E02D 5/801 52/157 |
| 5,224,310 A * | 7/1993 | Edwards | E02D 5/80 52/165 |
| 5,408,788 A * | 4/1995 | Hamilton | E02D 5/801 405/253 |
| 10,260,252 B2 * | 4/2019 | Boswell | E04H 15/62 |
| 10,287,797 B2 * | 5/2019 | Garcia | E04H 17/08 |
| 10,694,715 B1 * | 6/2020 | Edmonds | A01K 1/029 |
| 11,851,839 B1 * | 12/2023 | Fuller | E02D 5/38 |
| 2006/0051183 A1 * | 3/2006 | Powell | E04H 12/2223 411/386 |
| 2017/0202309 A1 * | 7/2017 | Sterman | A43B 23/0225 |
| 2020/0248424 A1 * | 8/2020 | Hudson | F24S 25/12 |
| 2023/0165613 A1 * | 6/2023 | Miller | B33Y 80/00 606/308 |
| 2024/0125071 A1 * | 4/2024 | Masghouni | E02D 5/54 |
| 2024/0191450 A1 * | 6/2024 | Falzone | B63B 21/26 |

FOREIGN PATENT DOCUMENTS

| | | |
|---|---|---|
| CN | 207419467 U | 5/2018 |
| WO | 90/08877 A1 | 8/1990 |

* cited by examiner

*Primary Examiner* — Chi Q Nguyen
(74) *Attorney, Agent, or Firm* — Andrzej Malarz, Esq.

(57) ABSTRACT

An earth anchor comprises at least one anchoring part connected by a connecting part to the driving part, wherein the driving part is designed for installing the anchoring part in the desired position in the soil and for connecting to an external structure. The anchoring part and the connecting part are manufactured with a polymer on a 3D printer.

8 Claims, 5 Drawing Sheets

EARTH ANCHORS AND METHOD OF PRODUCTION THEREOF

BACKGROUND OF THE INVENTION

Field of the Invention

The present disclosure generally relates to rock and soil mechanics, building industry, infrastructures, onshore and offshore applications and construction engineering, and more particularly to mechanical earth anchors, new materials and construction technique used for their production and a method of production thereof.

Brief Description of the Background of the Invention Including Prior Art

Developing a construction project always requires providing adequate stability and support, without which the structure, subject to environmental stress as well as its own weight, is prone to falling apart. As a typical construction project requires a stable and robust foundation and a durable support of its structure, a field of relatively low-weight, either permanent or temporary structures exists, which typically does not need a standard, extensive foundation to be prepared before its construction. Such structures include tents, stages, exhibition showpieces, advertising displays, scientific apparatus, retaining walls, marine structures, guyed masts, utility posts, pipelines, subsided areas with subsidence and sinkhole, and many others. Such structures, often designed to withstand by itself only a vertical stress resulting from their own weight, depend on ground-based guy lines in order to provide the support needed for the construction not to collapse. Typically, one end of the guy line is attached to the structure and the other to an anchor, placed in ground. As the guy lines are subject to great loads resulting from the often significant heights of the structures they support, the anchors need to hold on firmly to the ground.

Earth anchors are primarily designed and constructed to resist outwardly directed loads imposed on the foundation of a structure. There are few different kinds of the earth anchors known, but the purpose of all of them is the same. Earth anchors are separated to two types: 1) grouting anchors, 2) mechanical anchors. Examples of the mechanical earth anchors are: anchor plates, anchor screws or helical anchors and irregular shaped anchors as keying anchors. Anchor plates play an important role in the design of structures such as for example: seawalls, transmission towers, tunnels, buried pipelines, and retaining walls. Design and construction of the soil anchor plates focuses on the various theories based on the design and construction techniques of anchor plates in soil mechanics. Anchor plates can have various shapes, like for example: square, rectangular, strip and circular shapes. Existing earth anchors are produced mainly from steel or galvanized metal materials. Apart from the materials used, the shape of the anchor and the method of attachment into the ground define how well the anchor will support the guy-lined structure and how fast the construction process can proceed. Many methods of attachment of an earth anchor into the ground exists and results from the anchor design. For example, a helical or screw earth anchor includes a helix around its longitudinal extension, which allows for an easy screwing of the anchor into the ground and attaching the guy line. Another type of an earth anchor is a keying anchor, which is characterized by its specific design, allowing it to be easily inserted into the ground with the guy line attached. After the insertion is done, the guy line is pulled, which makes the anchor body rotate and lock inside the ground, providing a support for the guy-lined structure. One of the subtype of the keying anchors is an earth plate anchor. Its shovel-like design facilitates the insertion process and, because of its simplicity, is not hard and expensive to produce.

Another factor to consider in case of earth anchors is the material used for the construction of the device. Various commercial types of steel keying anchors, such as "duckbill" or "mantaray" are known. Steel is a popular choice as a construction material for earth anchors, because of its high strength, durability, availability and ease of production. However, in terms of steel earth anchors, corrosion is a significant concern, because of the soil moisture and salinity, which degrade the mechanical properties of the steel over time. This can be resolved by using a stainless steel or other non-corrosive metals, with a disadvantage of much higher material cost.

WO1990008877A1 discloses an anchor bolt of oriented polymer having an outer layer of isotropic polymer in which a multiplicity of radial ribs or a helical thread is formed, with the ribs/thread having an angle of inclination with respect to the longitudinal axis of the bolt of less than about 10°. The disclosed anchor, because of the use of the polymer as the building material, provide very high structural integrity of the anchor while being immune to the corrosive effect of the saturated soil. However, as the anchor is a helical type, it suffers from a typical disadvantage of this kind of earth anchors, which is a specific soil characteristics, which allow for the use of such an anchor. While a compact and uniform soil will allow for a helical anchor to be screwed inside easily, a loose ground of a varied composition, including stones and other impurities, will constitute a challenge for this type of an earth anchor.

CN207419467 discloses an earth anchor for municipal works. The anchor comprises multiple ground anchor rods, each provided with a connecting ring, and a ground anchor tip. A spiral blade is arranged on the bottom outer side wall of each bolt. The spiral blade further includes a connecting plate, a left connecting rod, a right connecting rod and a fixing nut. As the assembly comprises multiple helical-type earth anchors, it provides an improved pull-out strength capabilities without complex design changes, which greatly benefits the production costs. However, the helical type anchors may require sophisticated equipment necessary to screw the anchor into the ground, especially in case of an anchor comprising multiple screws, needing more power than a single-screw anchor, particularly when a hard, compact soil is being accessed.

U.S. Pat. No. 3,282,002A discloses a keying device for embedment anchor. The anchor includes tip and tail sections, interconnected pivotally with each other. The anchor includes a loop in a tail section providing means for attaching the anchor cable to the anchor body. The anchor, after insertion into the ground and application of force from the anchor cable, performs an underground rotation after its fin section is pushed into the ground above. The anchor rotates away from its position substantially parallel to the anchor cable, providing a maximum resistance to withdrawal from the earth. Such a distribution of the anchor body into two separate sections connected pivotally provides an easier rotation underground but also requires more sophisticated production process, as parts such as hinges and pins are required. Also, corrosion must be considered, as complex designs often depend more on the strength of its building material than simpler designs.

All of the above presented earth anchors known from the prior art must be produced in advance before providing them to the specific construction site. The production requires a production facility, a central warehouse or a distribution center, delivery chain, local warehouses, local stores, transportation and a stock of different types and/or different sizes of the anchors. It generates costs. Furthermore, it can be assumed that the distance from the local stores to the specific construction site and the opening hours are not always suitable for the construction schedule. Therefore, in order to avoid delays, it is usually required by the construction management to order the anchors in excess. The surplus of the anchors after the construction is completed is usually thrown away for scrap. It generates even more costs. In addition, the material of the anchors is usually a galvanized steel, which is more expensive and heavier as compared to other materials, for example polymers. The steel and also the galvanized steel is also not resistant enough to a salty sea water.

SUMMARY OF THE INVENTION

Purposes of the Invention

It is an object of the present invention to provide earth anchors which will overcome the above specified drawbacks of the anchors known from the prior art. In particular, it is an object of the present invention to provide earth anchors which are significantly cheaper, are completely resistant to the salty sea water and other atmospheric factors, and also can be manufactured on the specific construction site without the surplus, exactly according to the dimensions and other specific features required on the construction site, without delay.

These and other objects and advantages of the present invention will become apparent from the detailed description, which follows.

Brief Description of the Invention

The object of the invention is an earth anchor, comprising at least one anchoring part connectable or connected by a connecting part to a driving part for installing the anchoring part in the desired position in the soil and for connecting to an external structure (not claimed), wherein the anchoring part is connectable or connected on its distal end to the anchoring part, and on the proximal end is connectable to an external driving device or to the external structure or designed for receiving a force, for example created by a hitting device, or just for placing the anchor in the desired position in the soil. The anchoring part and the connecting part are manufactured of polymer. The driving part can be made of polymer or metal, for example steel or aluminum. The polymer includes a Polycarbonate (PC), a Nano-Polymers, a Bio-Polymers, Nano-Bio Polymers, Nano-Bio Filaments or Bio-Filaments. The polymer material is provided in a form of a filament wound on a exchangeable spool, or placed in a cartridge, suitable to be loaded to a 3D printer as an input material and used for the 3D printing of any designed shape, according to a computer program entered to the control device of the 3D printer. The anchoring part and the connecting part is produced on a 3D printer by using a polymer filament designed as a material for printing on the 3D printer. All usable shapes and sizes of all the parts of the earth anchors according to this invention can be stored in the memory of the storage medium of the 3D printer or they can be loaded to the 3D printer from an external memory medium like a USB pen drive, a smartphone or similar, or can be loaded from any Internet site using a WiFi connection or a wire connection. The 3D printers and the polymer filaments used by the 3D printers are well known in the art and they are not an object of the invention. The polymer filaments are standard filaments available on the market, therefore they can be used for any shape to be printed on the 3D printer. If there is an excess left, they are not thrown away after the project is finished, instead they can be used for another project without any waste of the material. All the parts of the earth anchors printed on the 3D printer can be assembled using simple tools, or can be even assembled by hand, without using any tools or are manufactured as one piece and do not require assembly at all. All of the parts of the earth anchor are dimensioned according to the specific requirements of the construction site and the forces which will act on the specific earth anchor. The earth anchors can be utilized for numerous applications within various industries, including agriculture, growers, fencing, trellis, mining, geotextiles, landscaping and civil. Various projects need to different bearing capacity or uplift loading. Various types of the earth anchors are used in horizontal, vertical and inclined positions because they are used for various applications in building industry and infrastructures. Preferably, the earth anchor is manufactured in a form of a plate anchor, wherein the anchoring part is a substantially flat plate in a shape of a circle or square or rectangle or polygon, or any other irregular shape depending on the construction site requirements. The anchoring part is connected substantially perpendicular to the driving part, which in this case is the anchor rod, pivotally or permanently by the connecting part. In case of the permanent connection, the driving part in a form of anchor rod can be connected to the anchoring part by a screw connection. In this case there is a hole provided substantially in the middle of the anchoring part, one end of the anchor rod is threaded and passes through the hole, and the anchor rod is fixed in relation to the anchoring part by nuts from both sides of the anchoring part. The anchor rod can be made of steel or fibre-reinforced plastic (FRP). In case of the pivotal connection, the connecting part is preferably a pivot or joint matching the hub of the anchoring part with a loose fit. The plate earth anchor comprises the polymer plate. The plate anchor when attached to the anchor rod has the configuration of a cross with the earth cleats facing toward the structure such as tents, transmission towers, retaining walls, sea walls, etc. The plate earth anchor is placed to suitable embedment ratio into soil. The embedment ratio=L/D, where L means embedment length, and D means the anchor width/diameter. The earth plate anchors need excavation and backfill. The advantage of the pivotal connection is that after the backfill the angle of the anchor rod in relation to the construction facility can be adjusted. Preferably, the earth anchor is provided in a form of a screw anchor known also as a helical anchor, a helical pile or helical pier. The helical anchor can include a single helix or a multi-helix as the anchoring parts. In another words, each of the anchoring part is at least a part of a helical screw connected permanently to the driving part by the connecting part. The anchoring part, the connecting part and the driving part are manufactured as one piece on a 3D printer. The helical anchor is a foundations base system that is made up of helically shaped polymer plates which are permanently attached to a polymer beam which is the driving part. The polymer plates' thickness, number, helices, and diameter standing are dependent on the controlled or supported structure design life, the environmental corrosion and geotechnical parameters, and also the design load demands. The screw anchor can include one, two, three or more separate anchoring parts, or the anchoring parts can be connected and made as one piece. The helical anchors are set up into the earth utilizing the driving part in a form of a rotary attachments fitted to earth-moving equipment. Because of this, they do not need substantial excavation operations. Resistance is offered by the plates when they have progressed to a depth. The load is then transferred by them. In one embodiment the anchoring part is a helical screw connected permanently to the body part by the connecting part, wherein the helical screw, the body part and the connecting part are manufactured as one piece on the 3D printer in one printing process. Preferably, the earth anchor is in a form of a keying anchor, comprising an essentially elongated anchoring part, having a leading end and a trailing end, a longitudinal axis extending from the leading end to the trailing end, a blind bore extending approximately to the middle of the anchoring part between the leading end and the trailing end, along the longitudinal axis from the trailing end of the anchoring part, a through hole provided on the connecting part, positioned substantially in the middle of the anchoring part between the leading end and the trailing end, and a sharp leading part projecting from the leading end of the anchoring part, the leading end being formed as a tapering top reinforced by the distal end of the anchoring part. The anchoring part and the connecting part are manufactured as one piece on the 3D printer. In one embodiment the earth anchor is provided in a form of a flat keying anchor comprising an essentially flat anchoring part. In one embodiment the earth anchor is provided in a form of a cylindrical keying anchor comprising an essentially cylindrical anchoring part. The driving part can include two members, first member for driving the keying anchor into the soil and a second member for actuating the anchoring part by pulling up, which move turns the anchoring part substantially perpendicular to the longitudinale direction of the second member and to the applied load during operation. The through hole is designed for receiving a pin fixed in a clamp at the distal end of the second member of the driving part and forming a joint, and the second member is designed for actuating the keying anchor after it is positioned in the required place. The leading end is tapered towards the distal end of the anchoring part, while the tailing end is provided with an axial blind bore for receiving the first member of the driving part. The anchoring part and the connecting part are manufactured as one piece from polymer on the 3D printer. The keying anchors are substantially vertical driven into the earth by the first member of the driving part and the anchoring part is pulled by the driving part or by the second member of the driving part, connected with the clamp and the pin on its distal end to the through hole being the connecting part and forming a joint, to a substantially horizontal position, increasing pressure and load capacity of the keying anchor. An advantage of the keying anchoring is minimizing the soil disturbance with no digging or earth moving. The keying anchors does not disturb the structure of the formation, they may be used in different types of soil. The anchoring system is buried and sealed without the use of cement paste. The keying anchors are environmentally friendly. They does not require any drilling equipment, the installation is simple using standard tools. The installation does not require excessive manpower. Another object of the present invention is a method of production of the earth anchors, wherein the anchoring part and the connecting part are produced on a 3D printer by using a polymer filament designed as a material for printing on the 3D printer. Any 3D printer available on the market can be used for this purpose. The 3D printers for printing objects using a polymer filament are known and there is no need to describe them in detail. FIG. 11 shows an example of such 3D printer.

BRIEF DESCRIPTION OF THE DRAWINGS

These aims together with other objects and advantages which will become subsequently apparent reside in the details of construction and operation as more fully hereinafter described and claimed, reference being made to the accompanying drawings forming a part hereof, wherein the same numerals refer to the same parts throughout.

In drawings

FIG. 4 is a side view of the screw anchor from FIG. 3a,

FIG. 5 is a top view of the screw anchor from FIG. 3a,

DETAILED DESCRIPTION OF INVENTION AND PREFERRED EMBODIMENT

Figures 1A, 1B:
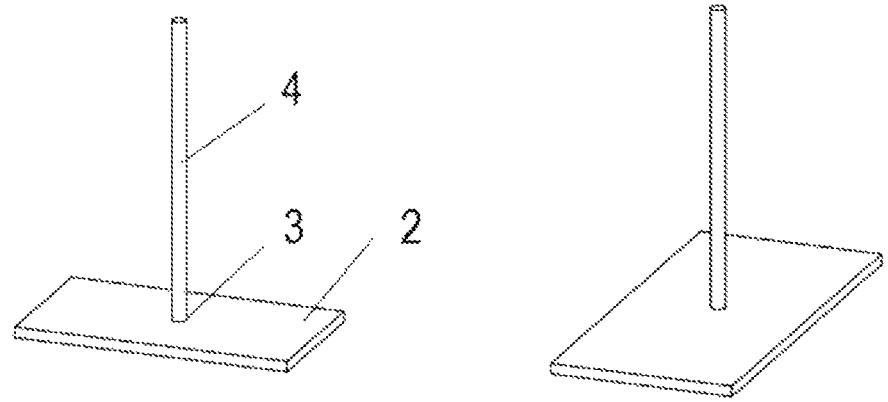
FIG. 1a-1b show schematically different embodiments of the plate anchors.
Figures 2A, 2B:
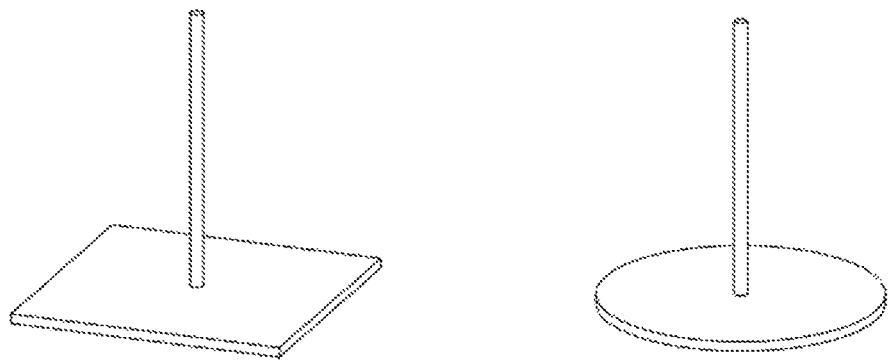
FIG. 2a-2b show schematically another embodiments of the plate anchors.

In describing a preferred embodiment of the invention illustrated in the accompanying drawings, specific terminology will be resorted to for the sake of clarity. However, the invention is not intended to be limited to the specific terms so selected, and it is to be understood that each specific term includes all technical equivalents which operate in a similar manner to accomplish a similar purpose. Referring to the drawing, FIG. 1a, FIG. 1b, FIG. 2a and FIG. 2b schematically show different embodiments of the plate-type anchors (known as plate anchors). FIG. 1a shows a strip-type anchor, FIG. 1b shows a rectangular-type anchor, FIG. 2a shows a square-type anchor and FIG. 2b shows a circular-type anchor. All the shapes refer to the shape of the anchoring part 2, which is connected by a connecting part 3, integrated as one part with the driving part 4. The connecting part 3 is reinforced connection between the anchoring part 2 and the connecting part 3, created by additional polymer material similar to an angle weld around the joint. All parts of the different embodiments of the plate anchors are manufactures from the polymer as one part on the 3D printer.

Figures 3A, 3B, 3C:
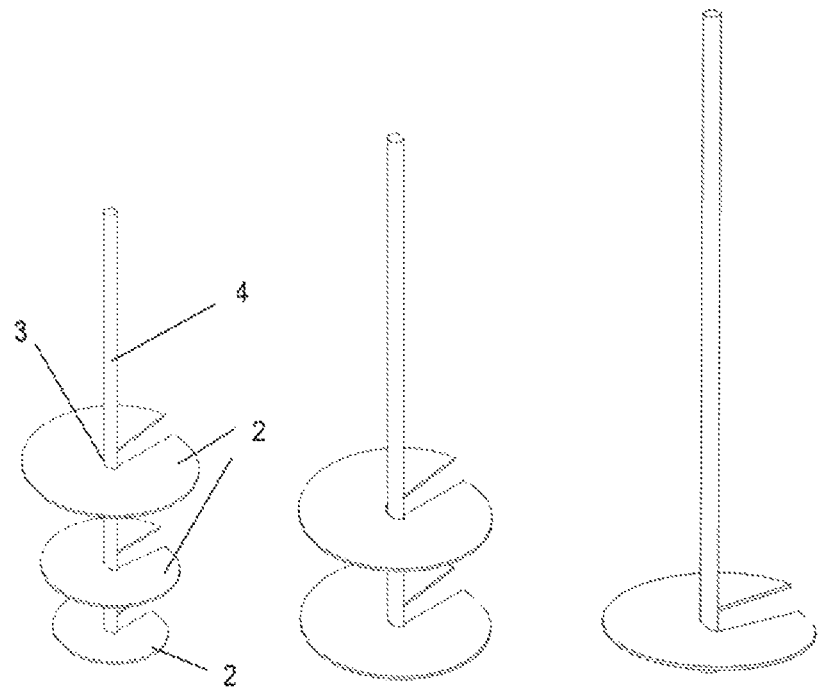
FIG. 3a-3c show perspective view of different embodiments of the screw anchors.
Figures 4, 5:
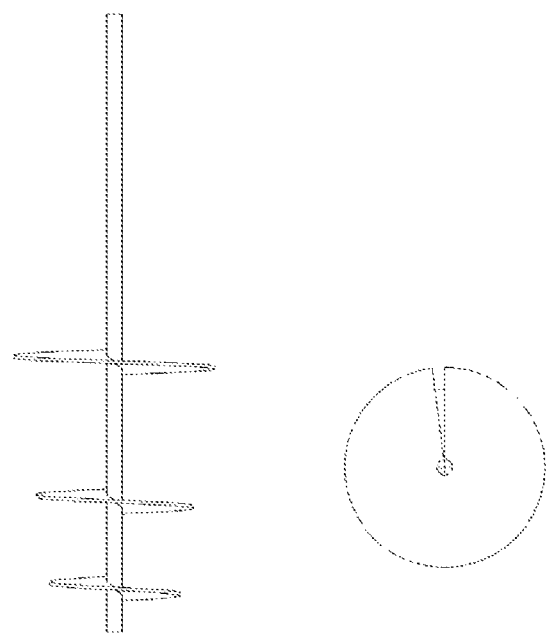

FIG. 3a, FIG. 3b and FIG. 3c schematically show different embodiments of the screw-type anchors (known as screw anchors). FIG. 3a shows the screw anchor with three anchoring parts 2 shaped as a parts of a helical screw. Looking from top to the bottom of the screw anchor (when installed in the soil), the top anchoring part is the biggest one (as looking on the diameter), the bottom anchoring part is the smallest one and the diameter of the middle anchoring part is in between of the diameter of the top and the bottom anchoring part. It allows easier installation to the ground. As shown on FIG. 3a, three anchoring parts 2 are connected to the driving part 4 by the connecting part 3. The connecting part 3 is reinforced connection between the anchoring part 2 and the connecting part 3, created by additional polimer material similar to an angle weld around the joint. All parts of the different embodiments of the screw anchors are manufactures from the polymer as one part on the 3D printer. FIG. 4 shows the side view of the screw anchor presented on FIG. 3*a*, and FIG. 5 shows the top view of the screw anchor presented on FIG. 3*a*. The corresponding views of the screw anchors from FIGS. 3*b* and 3*c* are similar, therefore they are omitted.

Figure 6:
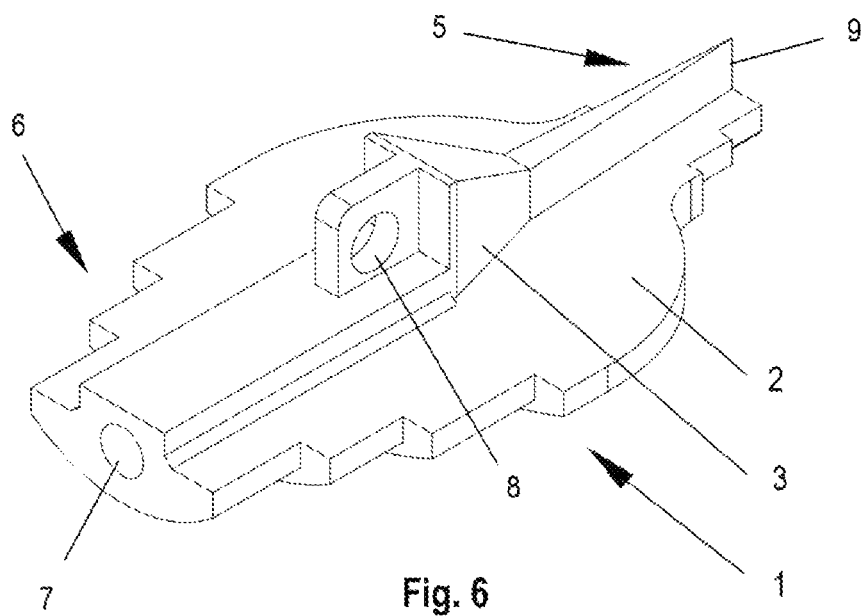
FIG. 6 is a perspective view of the flat keying anchor.
Figure 7:
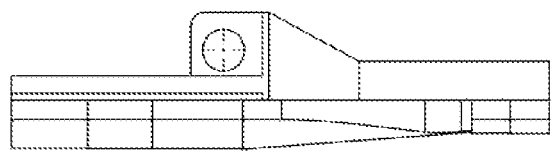
FIG. 7 is a side view of the keying anchor from FIG. 6.
Figure 8:
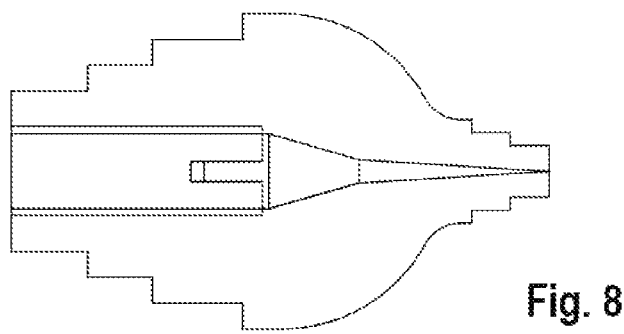
FIG. 8 is a top view of the keying anchor from FIG. 6.
Figure 9:
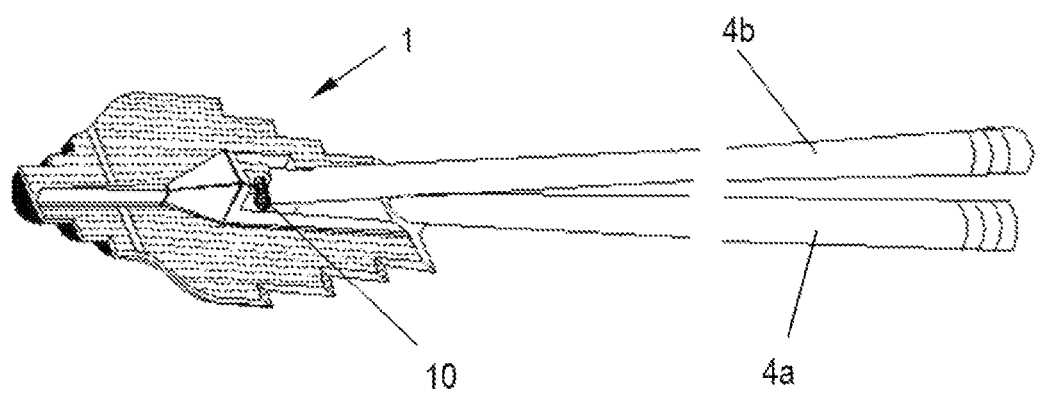
FIG. 9 is a perspective view of the flat keying anchor shown with the two members of the driving part.

FIG. 6 shows the perspective view of the flat keying anchor. The anchoring part 2 and the connecting part 3 are manufactured as one part from the polymer on the 3D printer. FIG. 7 and FIG. 8 shows the side view and the top view of the keying anchor respectively. FIG. 9 shows the keying anchor from FIGS. 6-8, with the driving part 4. The driving part 4 is made of two members, first member 4*a* for driving the anchoring part into the ground is entering the blind bore 7, and the second member 4*b* for pooling out the anchoring part into the anchoring position is connected pivotaly to the anchoring part with its hub and a pin 10 passing the through hole 8 and creating the joint. After installing the keying anchor in the desired position in soil, the first member can be left in the soil or can be pulled out and used for installing another keying anchors, and the second member is used for connecting the plate anchor with the external structure.

Figure 10:
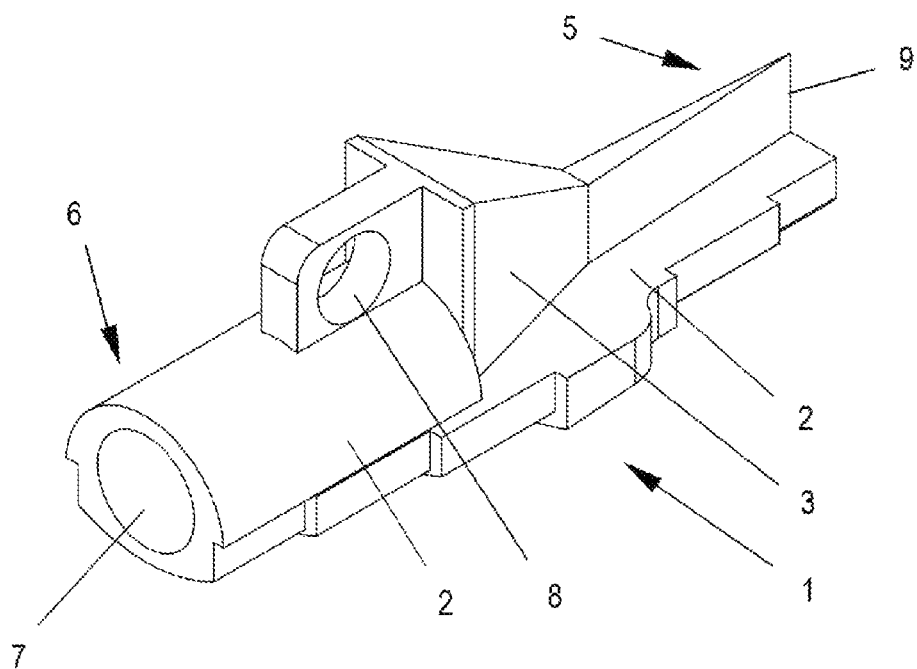
FIG. 10 is a perspective view of the cylindrical keying anchor.
Figure 11:
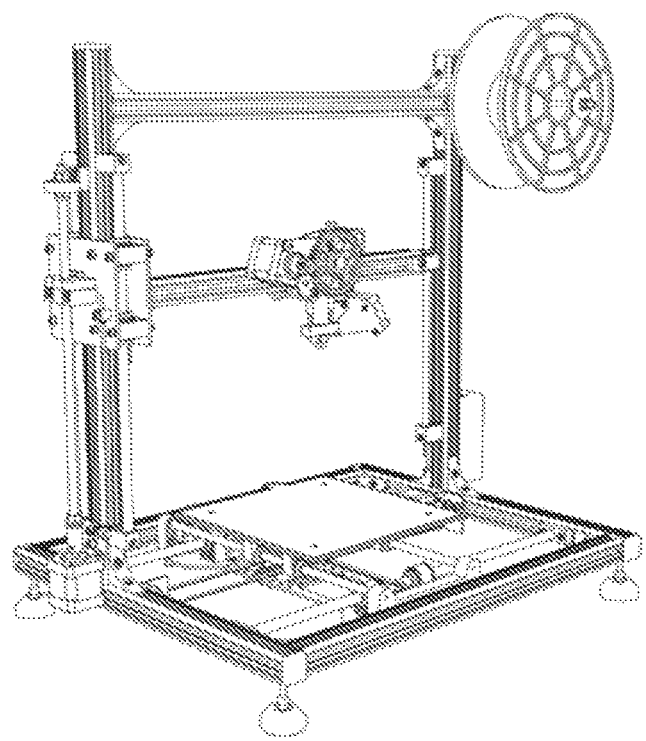
FIG. 11 shows an example of a 3D printer for printing with a polymer filament.

FIG. 10 shows the perspective view of the cylindrical keying anchor which is similar to the flat keying anchor. The difference is the shape of the anchoring part which is essentially cylindrical. The cylindrical keying anchor is comprising at least partially cylindrical elongated anchoring part 2, having a leading end 5 and a trailing end 6, a longitudinal axis extending from the leading end 5 to the trailing end 6 and a through hole 8 provided on the connecting part 3, positioned substantially in the middle between the leading end 5 and the trailing end 6. FIG. 11 shows an example of a 3D printer from prior art for printing with a polymer filament (not claimed).

The polymer earth anchors according to this invention can be manufactured according to the specific type, design, shape and the exact required quantity on the construction site in a short time without delay. It is also possible to use an automatic 3D printers and print the earth anchors after working hours, during night or a weekend without any employee service. The polymer material is cheaper than steel and galvanized materials. In a ground water level zones, the polymer earth anchors can be used without time limit because they do not corrode, in contrast to the steel or galvanized earth anchors. The earth anchors were tested in tension (pull out) and compression test laboratory for single and multi-layered soils. The test results were similar to the steel anchors known from the prior art.

In describing a preferred embodiment of the invention, specific terminology is resorted to for the sake of clarity. However, the invention is not intended to be limited to the specific terms so selected, and it is to be understood that each specific term includes all technical equivalents which operate in a similar manner to accomplish a similar purpose.

What is claimed is:

1. An earth anchor (1), comprising at least one anchoring part (2) connectable or connected by a connecting part (3) to a driving part (4) for installing the at least one anchoring part (2) in a desired position in a soil and for connecting to an external structure, wherein the at least one anchoring part (2) comprises a leading end (5) and a trailing end (6), a longitudinal axis extending from the leading end (5) to the trailing end (6), a blind bore (7) extending along a longitudinal axis from the trailing end (6) of the at least one anchoring part (2), a through hole (8) provided on the connecting part (3), positioned substantially in a middle of the at least one anchoring part (2) between the leading end (5) and the trailing end (6) and a sharp leading part (9) projecting from the leading end (5) of the at least one anchoring part (2), wherein the leading end (5) is formed as a tapering top, wherein the at least one anchoring part (2) and the connecting part (3) are manufactured of a polymer as one piece.

2. The earth anchor according to claim 1, wherein the earth anchor is a plate anchor, wherein the at least one anchoring part is a plate (2) connected substantially perpendicular to the driving part (4) by the connecting part (3).

3. The earth anchor according to claim 1, wherein the earth anchor is a screw anchor and the at least one anchoring part (2) is at least a part of a helical screw connected permanently to the driving part (4) by the connecting part (3).

4. The earth anchor according to claim 1, wherein the at least one anchoring part (2) is essentially flat.

5. The earth anchor according to claim 1, wherein the at least one anchoring part (2), is essentially cylindrical.

6. The earth anchor according to claim 1, wherein the polymer includes a Polycarbonate (PC) or Nano-Polymers or Bio-Polymers or Nano-Bio Polymers or Nano-Bio Filaments or Bio-Filaments.

7. A method of production of the earth anchor according to claim 1, wherein the at least one anchoring part (2) and the connecting part (3) is produced on a 3D printer by using a polymer filament designed as a material for printing on the 3D printer.

8. The earth anchor according to claim 1, wherein the at least one anchoring part (2) is essentially elongated.

\* \* \* \* \*